Oct. 17, 1950     W. E. LEIBING     2,526,375
CONTROL DEVICE FOR CHANGE-SPEED TRANSMISSIONS
Filed Nov. 18, 1946     2 Sheets-Sheet 1
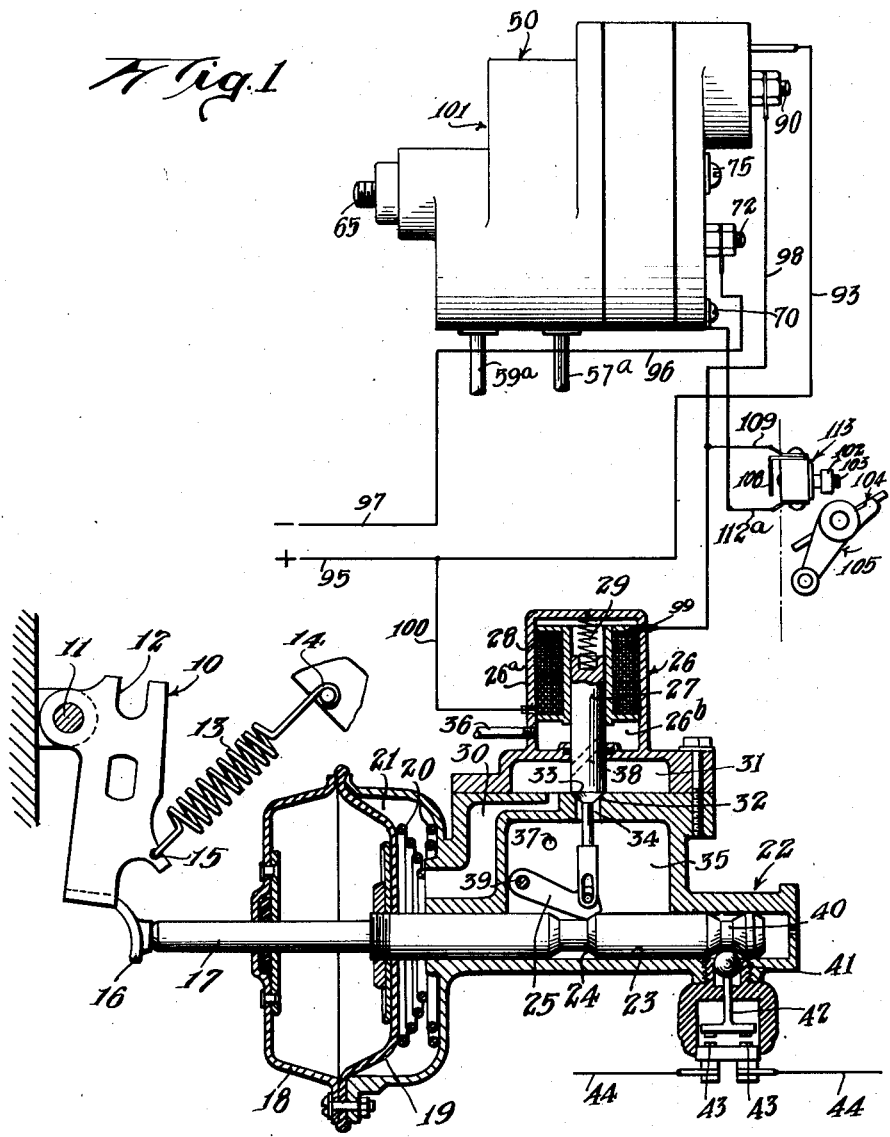
Inventor
William E. Leibing
By Lyon & Lyon
Attorneys Oct. 17, 1950 W. E. LEIBING 2,526,375
CONTROL DEVICE FOR CHANGE-SPEED TRANSMISSIONS
Filed Nov. 18, 1946 2 Sheets-Sheet 2
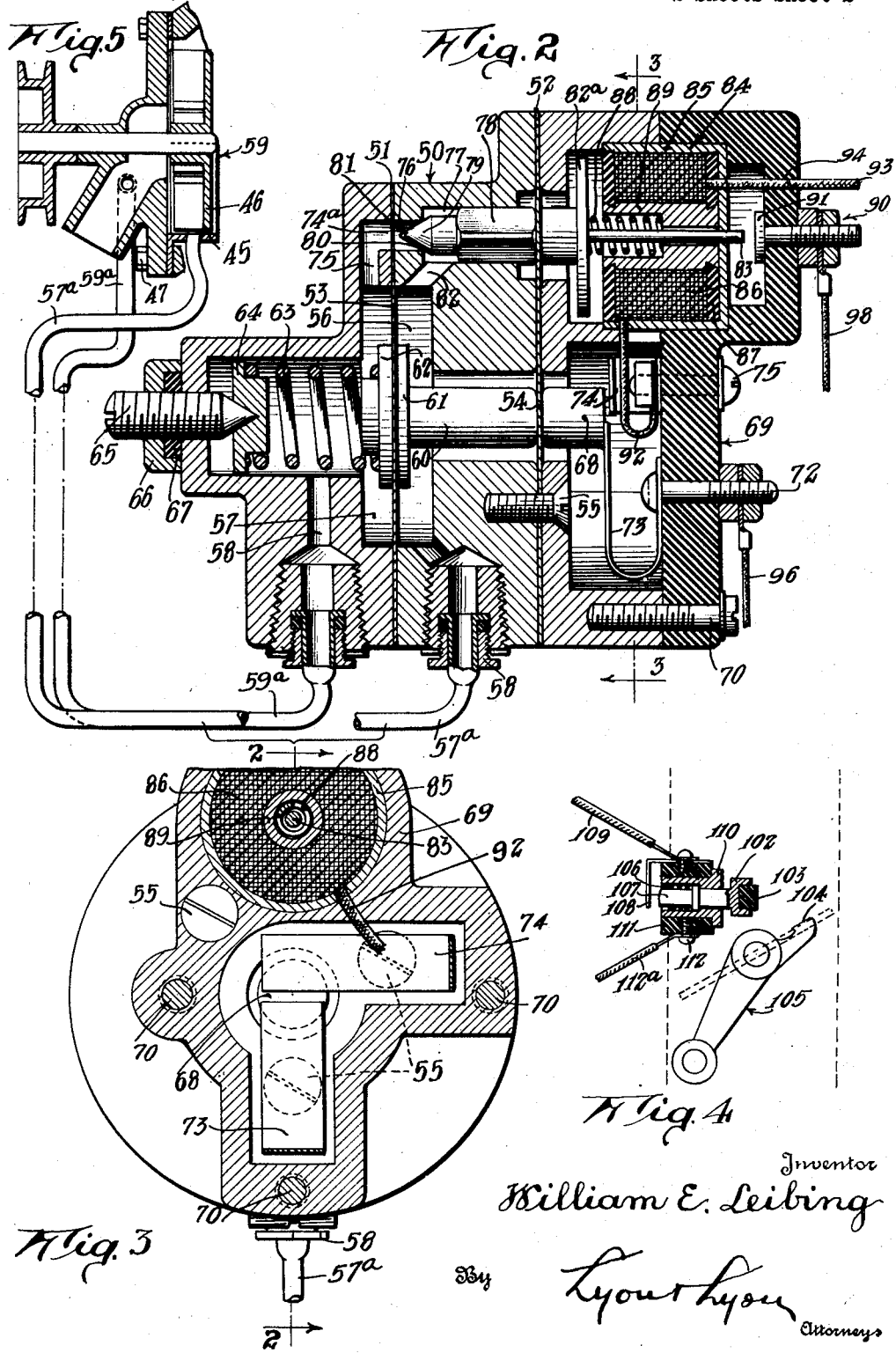

Patented Oct. 17, 1950

2,526,375

UNITED STATES PATENT OFFICE 2,526,375

CONTROL DEVICE FOR CHANGE-SPEED TRANSMISSIONS

William E. Leibing, Santa Barbara, Calif.

Application November 18, 1946, Serial No. 710,576

12 Claims. (Cl. 74—472)

This invention relates to improvements in speed governors of the type employed for the control of change-speed transmissions used in automobiles, trucks, buses, and the like. Such transmissions are used for both over-drives and under-drives and are used for changing the speed ratio between the internal combustion engine and the driving wheels. Control mechanisms for regulating the action of change-speed transmissions in accordance with varying engine speeds customarily employ a speed governor of the fly-ball type for controlling the action of the transmission shifter device, or optionally utilize a device sensitive to vacuum pressure in the manifold of the engine for the same purpose.

It is the principal object of this invention to provide a control device for change-speed transmission shifter mechanism, which does not employ either a centrifugal governor or depend upon vacuum pressures in the engine manifold.

Another object is to provide such a control device, which is operated by pressures existing at the discharge of the water-circulating pump, with which the cooling systems of internal combustion engines are commonly equipped.

Another object is to provide a control device of this type, which is economical to manufacture and install and in which the expense of upkeep and maintenance may be reduced substantially below that for a conventional apparatus.

Another object is to provide a control device for a change-speed transmission shifter mechanism, which is adapted to effect change of speed of drive through the transmission upon engine speed reaching a predetermined maximum and then permitting return to original transmission speed upon manual operation of a control lever without reducing the engine speed.

A further object is to provide a transmission control device in which the manual control lever for returning to the original transmission speed is rendered ineffective for speeds of the engine above a predetermined maximum.

Other objects and advantages will appear hereinafter.

In the drawings:

Figure 1 is a diagrammatical illustration of a shifter device for a change-speed transmission and including the control apparatus embodying my invention, the shifter device being shown in "high-speed" position;

Figure 2 is a sectional elevation of a control device embodying my invention, taken substantially on the lines 2—2, as shown in Figure 3, the parts of the control device being shown in "low-speed" position;

Figure 3 is a transverse sectional elevation, taken substantially on the lines 3—3, as shown in Figure 2;

Figure 4 is a fragmental elevation view, partly in section, showing details of the manually operable switch employed in connection with my control device; and Figure 5 is a fragmental sectional elevation of a water-circulating pump, employed in connection with my control device.

Referring to the drawings, a transmission shifter control lever 10 is pivotally mounted at 11 and adapted to move a sliding element, not shown, by means of a fork 12. A tension spring 13, having one end 14 secured to a stationary element, is connected to the shifter lever 10 at 15 and normally acts to turn the shifter control 10 in a counterclockwise direction about its pivot 11. Such motion of the shifter lever 10 serves to effect a high-speed drive in the change-speed transmission, not shown. In the position shown in Figure 1, the shifter control lever 10 maintains the transmission parts in position to effect a high-speed drive from the engine to the driven shaft of the transmission.

Means are provided for positioning the spring 13 to hold the transmission in its low-speed drive. This means includes a finger 16 of the lower end of the lever 10, which is adapted to be contacted by the extreme end of the actuator rod 17. This rod 17 extends through an enclosure 18 having a flexible diaphragm 19 positioned therein and secured on the rod 17 by any convenient means. An actuator spring 20 is positioned within a vacuum chamber 21, formed within the enclosure 18 on the backside of the flexible diaphragm 19. The actuator rod 17 is thus normally urged to the left, as viewed in Figure 1, by the compression spring 20.

A casing 22 is provided with a bore 23 for slidable reception of the actuator rod 17. A shoulder 24 on the rod 17 is adapted to be engaged by a pivoted latch 25, which is carried by the casing 22. Means are provided for actuating the latch and for admitting vacuum pressure from the engine manifold into the vacuum chamber 21. As shown in the drawings, this means includes a solenoid 26, provided with a central plunger 27 and the usual winding 28. A spring 29 may be provided for supplementing gravity in moving the plunger 27 to its lowest position, as illustrated. A passageway 30 in the wall of the casing 22 communicates between the vacuum chamber 21 and the chamber 31 within the casing 22. The plunger 27 is provided with a valve face 32, which is adapted to engage a valve seat 33, formed at the upper end of the opening 34. The opening 34 connects the chamber 31 with the chamber 35 in which the latch 25 operates. A vacuum inlet port 36 is connected by conduit means, not shown, to the engine manifold and communicates with the chamber 31 via the diagonal passageway 38 in the stem 27.

Means are provided for introducing atmospheric air into the chamber 31 and, as shown in the drawing, this means includes a port 37 communicating with the chamber 35 within the casing 22. Air under atmospheric pressure is admitted into the chamber 31 from the chamber 35 when the solenoid plunger 27 is raised, thereby disengaging the valve surface 32 from the valve surface 33. When the plunger 27 is resting on the valve seat 33, the diagonal passageway 38 in the plunger 27 connects the annulus 26b within the case 26a with the chamber 31 and, consequently, vacuum from the port 36 exhausts the chamber 31, passageway 30, and vacuum chamber 21, adjacent the flexible diaphragm 19. Reduction of pressure within the vacuum chamber 21 permits atmospheric air pressure on the left side of the flexible diaphragm 19 to move the actuator rod 17 to the right into the position shown in the drawings, at which point the latch 25 engages the shoulder 24 on the actuator rod 17 to prevent return of the actuator rod 17. It will be noted that movement of the rod 17, under such a pressure, serves to compress the spring 20.

When the solenoid 26 is energized by passing an electric current through the winding 28, the plunger 27 is drawn upwardly, by magnetic action, thereby separating the valve surface 32 from the valve seat 33. The diagonal passageway 38 no longer communicates with the chamber 31 and opening of the valve permits air under atmospheric pressure to flow into the chamber 31 and into the chamber 21, by way of the passageway 30. Upward movement of the plunger 27 also lifts the latch 25 about its pivot 39 to disengage the latch from the shoulder 24. The spring 20 then acts to move the actuator rod 17 toward the left to move the shifter control 10 to the low speed position. The actuator rod 17 remains in its extended position, until such time as the solenoid 26 is de-energized by cutting off the flow of current through the windings 28. When thus de-energized, the plunger 27 falls by gravity and is assisted in this motion by the spring 29. The valve surface 32 closes on the valve seat 33 and suction pressure is admitted into the chambers 31 and 21, by way of the diagonal passage 38. The latch 25 re-engages the shoulder 24 and the parts are in position for another cycle of operation.

A groove 40 is provided in the actuator rod 17 for cooperation with a ball 41. An ignition interrupter switch 42 is mounted on the casing 22 beneath the ball 41, in a manner so that, upon the ball 41 entering the groove 40, the switch 42 opens contacts 43, interrupting current in the line 44 in the ignition system of the engine. The interruption of the ignition system, at the moment of shifting transmission gears, has been found to be very beneficial in assuring a change of speed through the transmission with a minimum of shock.

The apparatus so far described relates to conventional equipment, with which the control apparatus, embodying my invention, is adapted to be employed.

My improved control device serves to actuate the solenoid when the engine speed reaches a predetermined value, and also provides additional means for actuating the solenoid, when it is desired to return to the original speed of drive, even though the engine is operating above such predetermined speed. Furthermore, the control means provided by my invention serves to again actuate the solenoid upon the engine speed falling below another predetermined minimum speed. An additional feature is also provided in preventing actuation of the solenoid at engine speeds above a preselected high limit, in order that unsafe operation of the transmission gears may be avoided.

In my copending application for Governor, Serial No. 679,020, filed June 24, 1946, now Patent No. 2,450,199, I have shown a device which is actuated by the discharge pressure of the water pump, ordinarily provided on internal combustion engines for circulating cooling water through the engine block. The same principle there employed may be utilized in connection with the present control device, the chief requirement being that a source of liquid pressure be provided, which increases as the engine speed increases. Ordinarily, the clearances around the impeller of such water pumps are so great that very little change in pressure is developed upon increasing speed of the pump, which is direct-driven from the engine. In other cases, the design of the pump is such that there is sufficient pressure variation from low speed to high speed, and the pump may be used without modification. In order that sufficient pressure variation may be obtained, it may be advisable to install an arcuate shield or vane 45 within the pump chamber and closely encircling the impeller 46 for a portion of its periphery. This vane 45 is stationary and may be held in position by means of bolts 47. As explained, the vane 45 may not be necessary and is only used when the particular design of water pump fails to provide sufficient pressure change upon increase in speed.

As shown in Figure 2, a divided housing generally designated 50, is split along the planes 51 and 52 and flexible diaphragms 53 and 54 are provided between adjacent parts of the housing 50, as shown. Any convenient means, such as machine screws 55, are provided for maintaining the three sections of the housing in operative relationship with the diaphragms 53 and 54 clamped in position. A pressure chamber 56 is provided within the housing 50 between the diaphragms 53 and 54 and this chamber 56 is connected to the vane 45, adjacent the pump impeller 46 by the conduit 57a and inlet fittings 58. The chamber 56, therefore, reflects pressure developed by the water pump, generally designated 59. A balance chamber 57 is provided within the housing 50 on the other side of the diaphragm 53 and this balance chamber is connected, through inlet opening 58 and conduit 59a, with the cooling system of the engine, at a point remote from the impeller 46. The purpose of this balance chamber is to avoid the error which would be occasioned by a pressure rise in the cooling system of the engine, due to heat. If the conduit 59a and balance chamber 57 were omitted, a pressure rise in the cooling system, due to heat, would be reflected in the chamber 56. For the proper operation of my device, it is necessary that such an effect be excluded and that the pressure chamber 56 reflect only such pressure as is developed, due to speed of the engine driven impeller 46.

A plunger 60, positioned centrally of the chamber 56, carries an enlarged flange 61 at one end.

This flange is connected by a central attachment, not shown, to a flanged boss 62 on the other side of the diaphragm 53. The boss 62 receives one end of a compression spring 63 and the other end of the spring is mounted against an adjustable boss 64, carried on the end of a set-screw 65. A lock nut 66, having a packing 67, may be provided on the set-screw 65, if desired. A contact element 68 is centrally connected with the plunger 60, by means, not shown, and is positioned on the other side of the diaphragm 54. An end cap generally designated 69, formed of insulating material, is secured to the housing 50 by any convenient means, such as machine screws 70, shown in section in Figure 3. Mounted on the end cap 69 is an electric terminal 72, carrying a spring member 73, adapted to engage the end of the contact 68. A similar spring member 74 is carried by machine screw 75, mounted on the end cap 69. The spring member 74 is positioned so that it engages the end of the contact 68, when a predetermined low pressure exists within the chamber 56. Movement of the contact 68 toward the left, as viewed in Figure 2, serves first to separate the contact 68 from the spring member 74 and, upon continued movement, to separate it from the spring member 73. It will be observed that the area of the diaphragm 54, which is exposed to the pressure within the chamber 56 is materially less than the area of the diaphragm 53, which is exposed to the same pressure, so that pressure within the chamber 56 serves to move the plunger 60 and contact 68 toward the left to compress the spring 63.

A port 74a is provided through the diaphragm 53, in communication with corresponding openings 75 and 76, formed in the mating parts of the housing 50. A cylindrical bore 77 is provided in the housing for reception of a fluted guide 78, carrying a conical surface 79 at its extreme end. A seat 80 is provided at one end of the opening 76, which cooperates with the surface 79 to close the opening 76. The fluted guide 78 and surface 79 comprise a needle valve, hereinafter referred to as 81. A port 82 connects the cylindrical bore with the pressure chamber 56. Upon movement of the needle valve 81 to the right, communication is established from the pressure chamber 56 to the balance chamber 57, by way of the port 82, passage 76, diaphragm port 74a, and opening 75.

Means are provided for moving the needle valve 81 toward the right. This means includes an armature 82a provided with a central boss, which is connected to the fluted guide 78 through the diaphragm 54, by means not shown. The armature, also, is integrally connected to a central post 83, extending through a relay, generally designated 84. The relay 84 is provided with a metallic cup 85, enclosing an electrical winding 86, mounted between fiber washers 87. A compression spring 88 encircles the post 83 and is received within a recess formed in the central body 89 of the relay 84. A terminal fitting 90 extends through the insulated cap member 69 and is provided with a contact head 91, adapted for engagement with the end of the post 83. One of the terminals of the winding 86 is connected by a lead 92 to the spring member 74 and the other terminal 93 extends through an opening 94 provided in the insulated cap member 69. The relay terminal 93 is connected to the "hot" line 95 supplying electrical energy, and the line 96 connected to the terminal 72 is attached to the return line 97. The line 98, connected to the terminal 90, is attached to the terminal 99 on the solenoid 26. The other terminal 100, on the solenoid 26, is connected to the "hot" line 95.

When the switch contacts 83, 91 are engaged, electrical current from the solenoid 26 passes through the line 98, switch contacts 83, 91, fluid stem 78 to the housing 50. The current then reaches the plunger 60 by way of the set-screw 65 and spring 63, and the current then passes through the spring member 73 to the terminal 72 and return line 96.

From the above description, it will be understood that the solenoid 26 is energized whenever the control device, generally designated 101, establishes contact from the line 98 to the line 96, thereby forming a circuit for passage of electrical energy.

Means supplementing the control device 101 are provided in order that an electrical connection may be established between the lines 98 and 96, when the speed of the engine is such that the control device 101 normally moves to a position to disestablish such electrical connection. As shown in Figure 4, this means includes a plunger 102, having an insulated contact block 103, adapted to be engaged by an extension 104 on the throttle control lever 105. Depressing the accelerator pedal of the vehicle beyond the normal full throttle position serves to move the throttle control lever 105 in a counterclockwise direction, as shown in Figure 4, to bring the extension 104 into engagement with the insulated contact block 103. The plunger 102 moves to the left, in opposition to the compression spring 106, to establish an electrical connection between the end 107 of the plunger 102 and the contact element 108, secured to the lead wire 109. The spring 106 is contained within a body 110, mounted within an insulated bracket 111. A metallic screw 112 extends through the insulated bracket into contact with the body 110 and is connected at its outer end to the lead wire 112a. The lead wire 112a is connected to the housing 50 by any convenient means such as, for example, by connection to one of the bolts 70, which maintain the insulated cap 69 in place. When the extension 104 moves the plunger 102 into electric contact with the element 108, an electrical connection is established between the line 109 and the line 112a. The line 109 is connected to the solenoid terminal 99. As long as the contact 68 is in engagement with the spring member 73, an electrical connection is provided between the line 112a and the line 96, by way of the housing 50, set screw 65, spring 63, and plunger 60.

In the operation of my device, the contact 68 is in engagement with the spring fingers 73 and 74, while the engine is rotating below a predetermined speed. As the engine speed increases, pressure within the chamber 56 increases and, at the preselected speed, the diaphragm 53 moves to the left against the spring 63 a sufficient distance to disengage the spring member 74 from the end of the contact 68. Electrical current, which formerly was flowing through the relay winding 86 through the "hot" line 95 and to the return line, by way of the lead 92, spring member 74, contact 68, and spring member 73 and return wire 96, is interrupted when the contact 68 leaves the spring member 74. When the relay winding 86 is thus de-energized, the magnetic attraction is terminated and the spring 88 moves the armature 82a to the left, thereby disconnecting the end of the post 83 from the terminal contact 91. The post 83 and contact 91 comprise an electrical switch, and opening of this switch de-energizes the solenoid 26 to permit the solenoid plunger 27 to drop. As previously described, descent of the solenoid plunger opens a vacuum line to the engine manifold and results in moving the actuator rod 17 to the right. The manifold vacuum and spring 13 then move the operating lever 10 to change the speed of drive in the transmission, not shown. From this description, it will be understood that separation of the post 83 and contact 91 results in changing the speed of drive through the transmission to a higher gear. Conversely, re-engagement of the post 83 with the contact 91 energizes the solenoid 26 to vent the vacuum chamber 21, unlatch the bar 17, and move the clutch operating lever 10 to effect a slower speed of drive through the transmission.

When the armature 82a moves to the left, the needle valve 81 is moved to its closed position, preventing further transfer of pressure fluid from the chamber 56 to the chamber 57, through the restricted passageways 62, 76, 74 and 75. Because the engine speed is reduced for a given road speed in the higher gear, correspondingly less pressure is developed by the water pump impeller 46 and, therefore, lesser pressure is communicated to the pressure chamber 56. However, closing of the restricted by-pass through the port 74 results in making effective a greater pressure differential across the diaphragm 53, since no portion of the pressure is lost via the bypass 74a. Therefore, the plunger 60 does not return toward the right, and the contact 68 remains separated from the spring member 74.

Under certain conditions, it may be desirable to shift back into the lower gear, notwithstanding the fact that the engine speed may be above the preselected value to which the shift to the higher gear occurred. Under such conditions, the operator depresses the accelerator pedal beyond full throttle position, thereby closing contacts 107 and 108 to establish an electrical connection from the solenoid terminal 99 to the return line 97, by way of the lead lines 109, 112, housing 50, plunger 60, contact 68 and spring member 73. As the engine speed increases, and while operating the transmission in the higher gear, this manual "kick-down" operation may be effected, at any time, at the will of the operator, until such time as the engine speed exceeds a preselected maximum, above which speed the transmission gears may not safely be shifted, without possibility of damaging shock. In order to prevent the possibility of changing the speed of drive in the transmission, when the engine is above safe shifting speed, means are provided for disconnecting the lead line 112 from the return line 96. As shown in the drawings, this is accomplished by the increase in pressure within the chamber 56 to a point where the diaphragm 53 and plunger 60 are moved further to the left in opposition to the spring 63 to separate the contact 68 from the spring member 73. This separation effectively interrupts the electrical connection between the housing 50 and the terminal 72, so that closing of the contacts 107 and 108 fail to complete an electric circuit.

As an example of the operation of this device in connection with a conventional automotive vehicle, the set-screw 65 may be adjusted so that pressure in the chamber 56 overcomes resistance of the spring 63 when the engine speed reaches a figure of 1200 R. P. M., for example. At this engine speed, the contact 68 leaves the spring member 74 and thus interrupts the flow of electrical energy through the windings 86 of the relay 84 and hence allows the spring 88 to separate the contacts 83 and 91. This results in shifting of the transmission gears into high gear, as described above. Although the engine speed may fall as low as 800 R. P. M., at practically the same car speed, the reduced pressure delivered to the chamber 56 does not permit the spring 63 to return the contact 68 into engagement with the spring member 74a because the bypass through port 74, formerly open, is now closed and the actual unit pressure within the chamber 56 is greatly increased.

The vehicle may be accelerated by increasing the speed of the engine and, during this time, the kick-down switch, generally designated 113, is available for returning the transmission to the low speed drive, whenever the operator should so desire. However, the "kick-down" switch 113 is ineffective for engine speeds above, for example, 2500 R. P. M., since the contact 68 moves out of engagement with the spring finger 73.

On deceleration, the shift from high gear to low gear is accomplished when the contact 68 engages the spring finger 74 to again energize the relay 84. It should be noted, however, that this shift back toward the lower speed is made at an engine speed considerably below that at which the shift to high gear was originally accomplished. This is true because the needle valve 81 closes the bypass through port 74, during the time that the transmission is in high gear. Therefore, the pressure in the chamber 56 must fall to a low value before the spring 63 moves contact 68 into engagement with spring finger 74. This difference in engine speed between the up-shift and down-shift is a very desirable feature, since it avoids unnecessary shifting of the change-speed transmission, when the engine is operating in the vicinity of the critical speed.

Having fully described my invention, it is to be understood that I do not wish to be limited to the details herein set forth, but my invention is of the full scope of the appended claims.

I claim:

1. In combination with an internal combustion engine having a driven pump for circulating a liquid coolant, and adapted to drive a change-speed transmission, the combination of shifter means including an electric switch for changing the speed of drive through the transmission, a diaphragm operatively connected for actuation of the electric switch, means subjecting one side of the diaphragm to the discharge pressure of the engine-driven circulating pump, means subjecting the other side of the diaphragm to the inlet pressure of said circulating pump, and adjustable resilient means adapted to supplement the action of the latter said means whereby the diaphragm may function to effect actuation of the electric switch at any desired discharge pressure of said pump.

2. In combination with an internal combustion engine having a driven liquid pump adapted to develop increasing discharge pressure upon increasing engine speed, and connected to drive a change-speed transmission, the combination of shifter means including an electric switch for changing the speed of drive through the transmission, pressure responsive means adapted to actuate the electric switch, conduit means subjecting the pressure responsive means to the pressure differential between the inlet and discharge pressure of said pump, and adjustable resilient means operatively connected to the pressure responsive means and adapted to oppose movement thereof, whereby said pressure responsive means may function to effect actuation of the electric switch at any desired discharge pressure of the pump.

3. In a control device for a change-speed transmission driven from an engine, and having electrically controlled shifter means for changing the speed of drive through the transmission, the combination of an electric switch for actuation of the electrically controlled shifter means, a flexible diaphragm adapted to actuate the switch, means adapted to subject one side of the diaphragm to increasing pressure upon increasing engine speed, a spring normally acting to oppose movement of the diaphragm under action of said pressure, a leakage port associated with the last said means whereby only partial pressure is applied against said diaphragm, a movable closure for said port whereby full available pressure may be applied against said diaphragm, and means operatively connecting the movable closure and the electric switch.

4. In a control device for a change-speed transmission driven from an engine, and having electrically controlled shifter means for changing the speed of drive through the transmission, the combination of an electric switch for actuation of the electrically controlled shifter means, an electric relay for actuating the switch, contact means for energizing the electric relay, pressure responsive means adapted to open said contact means, means adapted to subject one side of the diaphragm to increasing pressure upon increasing engine speed, resilient means normally acting to oppose movement of the pressure responsive means under action of said pressure, whereby the pressure responsive means may function to effect actuation of the switch at a predetermined engine speed, a leakage port establishing communication from one side of the diaphragm to the other, and a closure operable by said relay adapted to selectively close the leakage port.

5. In a control device for a change-speed transmission driven from an engine, and having electrically controlled shifter means for changing the speed of drive through the transmission, the combination of an electric switch for actuation of the electrically controlled shifter means, an electric relay for closing the switch, contact means for energizing the electric relay, pressure responsive means including a diaphragm adapted to open said contact means, means adapted to subject one side of the diaphragm to increasing pressure upon increasing engine speed, resilient means normally acting to close the contact means and oppose movement of the pressure responsive means under action of said pressure, whereby the pressure responsive means may open the contacts to deenergize the relay and open the switch at a predetermined engine speed, a leakage port establishing communication from one side of the diaphragm to the other, and a closure operable by said relay adapted to selectively close the leakage port.

6. In a control device for a change-speed transmission driven from an engine and having electrically controlled means for changing the speed of drive through the transmission, the combination of an electric circuit including a switch for actuation of the electrically controlled means, pressure responsive means adapted to actuate the switch, means including a conduit adapted to subject the pressure responsive means to increasing pressure upon increasing engine speed, a leakage port associated with the pressure responsive means whereby only partial pressure is effective upon said pressure responsive means, a movable closure for said port operatively connected to move to closed position upon actuation of the switch for upshift to a higher speed of drive, the closure being adapted for movement to open position upon actuation of the switch for downshift to a lower speed of drive, whereby the engine speed required to effect upshift is substantially greater than that required to effect downshift of the transmission.

7. In a control device for a change-speed transmission driven from an engine and having electrically controlled means for changing the speed of drive through the transmission, the combination of an electric circuit including a switch for actuation of the electrically controlled means, pressure responsive means adapted to actuate the switch, means including a conduit adapted to subject the pressure responsive means to increasing pressure upon increasing engine speed, regulating means for rendering the pressure responsive means partially ineffective, additional means responsive to actuation of the switch for upshift to a higher speed of drive adapted to substantially overcome the action of the regulating means and thereby render the pressure responsive means fully effective, said additional means being adapted to restore the normal action of the regulating means upon actuation of the switch for downshift to a lower speed of drive, whereby the engine speed required to effect upshift is substantially greater than that required to effect downshift of the transmission.

8. In a control device for a change-speed transmission driven from an engine and having remote controlled shifter means for changing the speed of drive through the transmission, the combination of a control device for the shifter means, said control device including a pressure responsive diaphragm, means adapted to subject one side of the diaphragm to increasing pressure upon increasing engine speed, means including a leakage port communicating with one side of the diaphragm and acting to reduce the pressure acting on the diaphragm, a movable closure for said port, and means responsive to increasing engine speed for moving the closure to close the port.

9. In a control device for a change-speed transmission driven from an engine and having remote controlled shifter means for changing the speed of drive through the transmission, the combination of a control device for the shifter means, said control device including a pressure responsive diaphragm, means adapted to subject one side of the diaphragm to increasing pressure upon increasing engine speed, resilient means normally acting to oppose movement of the diaphragm under action of said pressure, a leakage port establishing communication from one side of the diaphragm to the other, a movable closure for said port, and means responsive to increasing engine speed for moving the closure to close the port, said means acting to open the port when the engine speed falls to a predetermined value.

10. In a control device for a change-speed transmission driven from an engine and having remote controlled shifter means for changing the speed of drive through the transmission, the combination of a control device for the shifter means, said control device including a pressure responsive device, means adapted to subject one side of the pressure responsive device to increasing pressure upon increasing engine speed, a leakage port establishing communication from one side of the device to the other, a movable closure for said port, and means responsive to engine speed for operating the closure.

11. In a control device for a change-speed transmission driven from an engine and having remote controlled shifter means for changing the speed of drive through the transmission, the combination of a control device for the shifter means, said control device including a pressure responsive diaphragm, means including a coolant circulating pump driven by the engine and adapted to subject one side of the diaphragm to increasing coolant pressure upon increasing engine speed, means including a leakage port communicating with one side of the diaphragm and effective to bleed off part of the coolant pressure acting on said diaphragm, a movable closure for said port, and means responsive to increasing engine speed for moving the closure to close the port.

12. In a control device for a change-speed transmission driven from an engine and having remote controlled shifter means for changing the speed of drive through the transmission, the combination of a control device for the shifter means, said control device including a pressure responsive diaphragm, means including a coolant circulating pump driven by the engine and adapted to subject one side of the diaphragm to increasing coolant pressure upon increasing engine speed, resilient means normally acting to oppose movement of the diaphragm under action of said pressure, means including a leakage port communicating with one side of the diaphragm and effective to bleed off part of the coolant pressure acting on said diaphragm, a movable closure for said port, means responsive to increasing engine speed for moving the closure to close the port, whereby the full coolant pressure may act on said diaphragm.

WILLIAM E. LEIBING.

REFERENCES CITED

The following references are of record in the file of this patent:

UNITED STATES PATENTS

| Number | Name | Date |
|---|---|---|
| 1,813,731 | Fleischel | July 7, 1931 |
| 1,893,644 | Fleischel | Jan. 10, 1933 |